United States Patent
Koike et al.

(10) Patent No.: US 11,772,430 B2
(45) Date of Patent: Oct. 3, 2023

(54) TIRE

(71) Applicant: Sumitomo Rubber Industries, Ltd., Hyogo (JP)

(72) Inventors: Hiroki Koike, Kobe (JP); Masayuki Fujita, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 690 days.

(21) Appl. No.: 16/508,664

(22) Filed: Jul. 11, 2019

(65) Prior Publication Data

US 2020/0016937 A1 Jan. 16, 2020

(30) Foreign Application Priority Data

Jul. 12, 2018 (JP) ................. 2018-132543

(51) Int. Cl.
 B60C 11/12 (2006.01)
 B60C 11/03 (2006.01)
(52) U.S. Cl.
 CPC ........ B60C 11/1236 (2013.01); B60C 11/033 (2013.01); B60C 11/0304 (2013.01); B60C 11/0327 (2013.01); B60C 11/1263 (2013.01); B60C 11/1281 (2013.01); *B60C 2011/0341* (2013.01); *B60C 2011/0358* (2013.01);
 (Continued)
(58) Field of Classification Search
 CPC ............. B60C 11/0304; B60C 11/0327; B60C 11/1236; B60C 11/1263; B60C 11/1281; B60C 11/0306; B60C 11/033; B60C 2011/0341; B60C 2011/0358; B60C 2011/0369; B60C 2011/0381;
 (Continued)

(56) References Cited

U.S. PATENT DOCUMENTS 5,054,530 A * 10/1991 Shiraishi ............. B60C 11/0304
                                                   152/209.8
6,439,284 B1 * 8/2002 Fontaine ................. B60C 11/13
                                                   152/209.15
(Continued)

FOREIGN PATENT DOCUMENTS

EP    2 664 464 A1    11/2013
EP    3 081 393 A1    10/2016
(Continued)

OTHER PUBLICATIONS

Extended European Search Report issued in EP 19 18 5308.4-1012 by the European Patent Office dated Oct. 21, 2019.

*Primary Examiner* — Justin R Fischer
*Assistant Examiner* — Philip N Schwartz
(74) *Attorney, Agent, or Firm* — Studebaker & Brackett PC (57) ABSTRACT

A tire 1 includes a tread portion 2, and how the tire is to be oriented when mounted to a vehicle is specified for the tire. The tread portion 2 has an outer tread edge T1, an inner tread edge T2, a first crown main groove 4, a second crown main groove 5, and three land portions demarcated by the first crown main groove 4 and the second crown main groove 5. The land portions include an outer shoulder land portion 7 demarcated between the outer tread edge T1 and the first crown main groove 4. The outer shoulder land portion 7 has a largest width in a tire axial direction among the three land portions. The outer shoulder land portion 7 has an outer shoulder lateral groove 20 and an outer shoulder sipe 21.

16 Claims, 10 Drawing Sheets

(52) U.S. Cl.
CPC .......... *B60C 2011/0369* (2013.01); *B60C 2011/0372* (2013.01); *B60C 2011/0381* (2013.01); *B60C 2011/0395* (2013.01); *B60C 2011/1254* (2013.01)

(58) Field of Classification Search
CPC ....... B60C 2011/039; B60C 2011/1254; B60C 2011/0395; B60C 2011/0372
USPC .................................................. D12/505–532
See application file for complete search history.

(56) References Cited

U.S. PATENT DOCUMENTS

| | | | |
|---|---|---|---|
| 2005/0016652 A1* | 1/2005 | Iwasaki ................. | B60C 11/11 152/209.5 |
| 2015/0151588 A1* | 6/2015 | Munezawa ......... | B60C 11/0306 152/209.25 |
| 2016/0152090 A1* | 6/2016 | Takemoto ........... | B60C 11/1236 152/209.24 |
| 2017/0166014 A1* | 6/2017 | Takemoto ........... | B60C 11/0304 |
| 2018/0009269 A1* | 1/2018 | Kawagoe ............ | B60C 11/1236 |
| 2020/0016935 A1* | 1/2020 | Fujita .................. | B60C 11/1323 |

FOREIGN PATENT DOCUMENTS

| | | | | |
|---|---|---|---|---|
| EP | 3 213 931 A1 | 9/2017 | | |
| EP | 3 549 794 A1 | 10/2019 | | |
| JP | 2002225511 A | * | 8/2002 | ......... B60C 11/0304 |
| JP | 2013-139166 A | 7/2013 | | |
| JP | 2015-024797 A | 2/2015 | | |

\* cited by examiner

TIRE

BACKGROUND OF THE INVENTION

Field of the Invention

The present invention relates to a tire and specifically relates to a tire for which how the tire is to be oriented when mounted to a vehicle is specified.

Description of the Background Art

Japanese Laid-Open Patent Publication No. 2015-024797 proposes a pneumatic tire for which how the pneumatic tire is to be oriented when mounted to a vehicle is specified. The pneumatic tire disclosed in Japanese Laid-Open Patent Publication No. 2015-024797 has an outer shoulder land portion that is provided with: shoulder lug grooves each of which extends from a ground-contact edge of a tread and terminates within the outer shoulder land portion; first sipes each of which terminates at both ends thereof within the outer shoulder land portion; and third sipes each of which extends from the inner end of the shoulder lug groove to a central main groove.

For the pneumatic tire disclosed in Japanese Laid-Open Patent Publication No. 2015-024797, further improvement of steering stability is required. In particular, the pneumatic tire disclosed in Japanese Laid-Open Patent Publication No. 2015-024797 has a problem that initial responsiveness at the time of turning is poor.

SUMMARY OF THE INVENTION

The present invention has been made in view of the above circumstances, and a main object of the present invention is to provide a tire that can exhibit good steering stability.

The present invention is directed to a tire for which how the tire is to be oriented when mounted to a vehicle is specified, the tire including a tread portion, wherein: the tread portion has an outer tread edge located at an outer side of the vehicle when the tire is mounted on the vehicle, an inner tread edge located at an inner side of the vehicle when the tire is mounted on the vehicle, a first crown main groove extending continuously in a tire circumferential direction between the outer tread edge and a tire equator, a second crown main groove extending continuously in the tire circumferential direction at the inner tread edge side with respect to the first crown main groove, and three land portions demarcated by the first crown main groove and the second crown main groove; the land portions include an outer shoulder land portion demarcated between the outer tread edge and the first crown main groove; the outer shoulder land portion has a largest width in a tire axial direction among the three land portions; and the outer shoulder land portion has an outer shoulder lateral groove that extends from the outer tread edge and that terminates within the outer shoulder land portion, and an outer shoulder sipe that extends from the first crown main groove and that terminates within the outer shoulder land portion.

In the tire according to the present invention, preferably, each of the outer shoulder lateral groove and the outer shoulder sipe has a terminal end within the outer shoulder land portion, and the terminal end of the outer shoulder sipe is located outward of the terminal end of the outer shoulder lateral groove in the tire axial direction.

In the tire according to the present invention, preferably, the outer shoulder lateral groove includes an inner portion at the first crown main groove side with respect to the terminal end of the outer shoulder sipe, and a depth of the inner portion gradually decreases toward an inner side in the tire axial direction.

In the tire according to the present invention, the outer shoulder sipe preferably has a shallow portion having a depth smaller than a maximum depth of the outer shoulder sipe.

In the tire according to the present invention, preferably, the outer shoulder lateral groove has a terminal end within the outer shoulder land portion, and a length in the tire axial direction of the shallow portion of the outer shoulder sipe is larger than a distance in the tire axial direction from a groove edge of the first crown main groove to the terminal end of the outer shoulder lateral groove.

In the tire according to the present invention, the outer shoulder sipe preferably includes a body portion and a wide portion that is disposed outward of the body portion in a tire radial direction and that has a larger width than the body portion, in a transverse cross-section orthogonal to a longitudinal direction of the outer shoulder sipe.

In the tire according to the present invention, preferably, the tread portion includes an outer tread portion located between the tire equator and the outer tread edge and an inner tread portion located between the tire equator and the inner tread edge, and a land ratio of the outer tread portion is greater than a land ratio of the inner tread portion.

In the tire according to the present invention, preferably, the width in the tire axial direction of the outer shoulder land portion is 0.30 to 0.45 times the tread width.

In the tire according to the present invention, preferably, a crown land portion is demarcated between the first crown main groove and the second crown main groove, a width in the tire axial direction of the crown land portion is 0.15 to 0.25 times the tread width.

In the tire according to the present invention, preferably, a displacement amount by which the center of the crown land portion is displaced is 0.05 to 0.10 times the width in the tire axial direction of the crown land portion.

In the tire according to the present invention, preferably, a distance in the tire axial direction from the terminal end of the outer shoulder lateral groove to the terminal end of the outer shoulder sipe is 0.20 to 0.35 times the width in the tire axial direction of the outer shoulder land portion.

In the tire according to the present invention, preferably, a displacement amount by which the center of the crown land portion is displaced is 0.05 to 0.10 times the width in the tire axial direction of the crown land portion.

In the tire according to the present invention, preferably, an angle of the outer shoulder lateral groove relative to the tire axial direction is 0 to 20°.

In the tire according to the present invention, preferably, a length in the tire axial direction of the outer shoulder lateral groove is 0.70 to 0.92 times the width in the tire axial direction of the outer shoulder land portion.

The tread portion of the tire according to the present invention has three land portions demarcated by the first crown main groove and the second crown main groove. The land portions include an outer shoulder land portion demarcated between the outer tread edge and the first crown main groove. The outer shoulder land portion has the largest width in the tire axial direction among the three land portions.

The outer shoulder land portion according to the present invention has an outer shoulder lateral groove that extends from the outer tread edge and that terminates within the outer shoulder land portion, and an outer shoulder sipe that extends from the first crown main groove and that terminates within the outer shoulder land portion.

The outer shoulder lateral groove is easily opened at the outer tread edge side and is unlikely to be opened at the terminal end side within the outer shoulder land portion. In addition, the outer shoulder sipe is easily opened at the first crown main groove side and is unlikely to be opened at the terminal end side within the outer shoulder land portion. Thus, the outer shoulder land portion, which has the outer shoulder lateral groove and the outer shoulder sipe, easily causes torsional deformation in a ground-contact surface thereof when a slip angle is given. Therefore, in the tire according to the present invention, when a slip angle is given, the ground-contact surface of the outer shoulder land portion immediately causes torsional deformation so as to follow a road surface, and further generates cornering force without delay. In particular, since the outer shoulder land portion has the largest width in the tire axial direction among the three land portions, the outer shoulder land portion can be expected to generate greater cornering force. Thus, the tire according to the present invention has high initial responsiveness at the time of turning and exhibits good steering stability.

DESCRIPTION OF THE PREFERRED EMBODIMENTS

Hereinafter, an embodiment of the present invention will be described with reference to the drawings.

Figure 1:
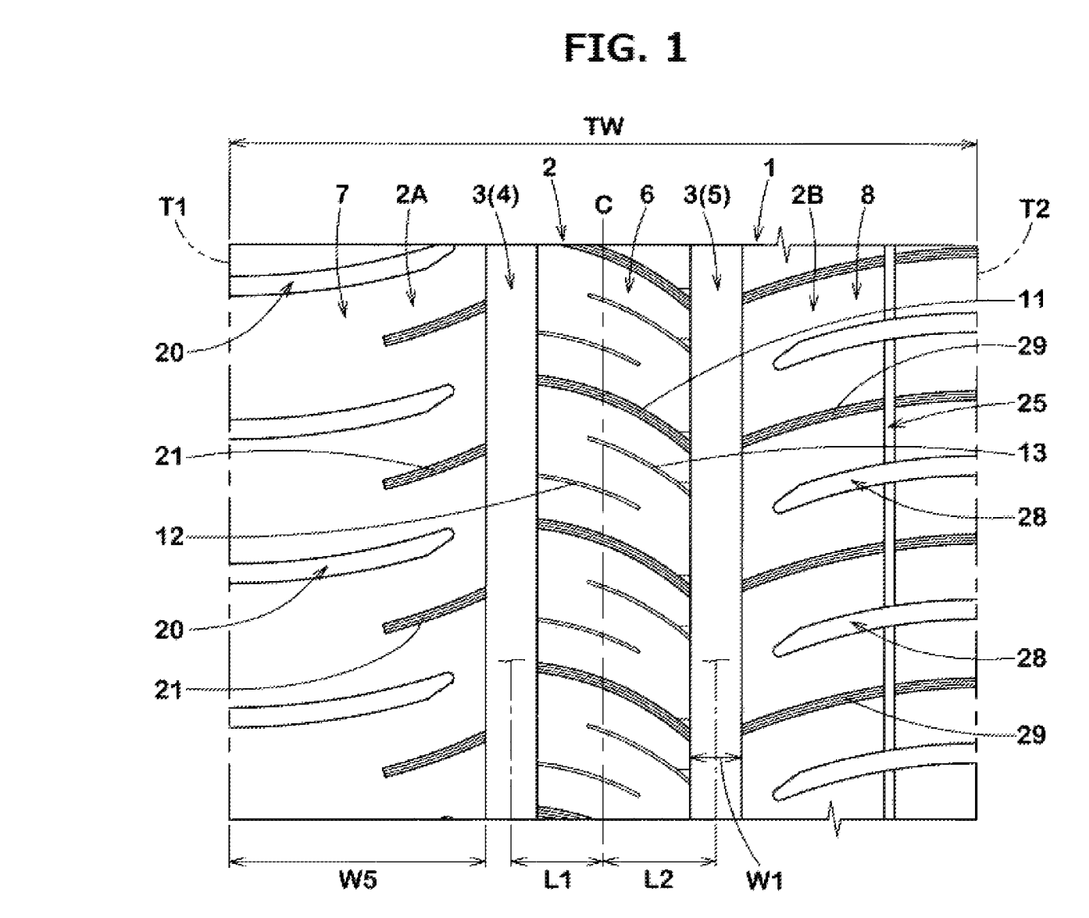
FIG. 1 is a development of a tread portion of a tire according to an embodiment of the present invention.

FIG. 1 shows a development of a tread portion 2 of a tire 1 according to the present embodiment. The tire 1 according to the present embodiment is formed, for example, as a pneumatic tire for a passenger car. However, the present invention is not limited to such an example.

As shown in FIG. 1, for the tire 1 according to the present embodiment, how the tire 1 is to be oriented when mounted to a vehicle is specified. How the tire 1 is to be oriented when mounted to a vehicle is indicated on a sidewall portion (not shown) of the tire 1, for example, by characters or a pictogram. When the tire 1 is mounted to a vehicle, the right side in FIG. 1 corresponds to the inner side of the vehicle, and the left side in FIG. 1 corresponds to the outer side of the vehicle.

Since how the tire 1 is to be oriented when mounted to a vehicle is specified, an outer tread edge T1 located at the outer side of the vehicle when the tire 1 is mounted on a vehicle and an inner tread edge T2 located at the inner side of the vehicle when the tire 1 is mounted on the vehicle are defined in the tread portion 2. Accordingly, the tread portion 2 includes: an outer tread portion 2A located between a tire equator C and the outer tread edge T1; and an inner tread portion 2B located between the tire equator C and the inner tread edge T2.

In the case of a pneumatic tire, each of the outer tread edge T1 and the inner tread edge T2 is a ground contact position at the outermost side in the tire axial direction when a normal load is applied to the tire 1 in a normal state and the tire 1 is brought into contact with a plane at a camber angle of 0°. The normal state is a state where the tire is mounted to a normal rim and inflated to a normal internal pressure and no load is applied to the tire. In the present specification, unless otherwise specified, dimensions of components of the tire and the like are values measured in the normal state.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

The "normal load" is a load that is defined, in a standard system including a standard on which the tire is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard.

The tread portion 2 includes main grooves 3 that continuously extend in the tire circumferential direction. Each main groove 3 extends continuously in the tire circumferential direction so as to have relatively large width and depth such that water on a road surface is drained rearward of the tire. In a preferred embodiment, each main groove 3 has a groove width and depth of 5 mm or greater and more preferably 6 mm or greater. In addition, the groove width W1 of the main groove 3 is, for example, 5.0% to 9.0% of a tread width TW. The depth of the main groove 3 is, for example, 5 to 12 mm. The tread width TW is the distance in the tire axial direction from the outer tread edge T1 to the inner tread edge T2 in the normal state. In the present embodiment, each main groove extends straight along the tire circumferential direction. In another embodiment, each main groove may extend non-linearly such as in a zigzag manner or in a wavy manner.

The main grooves 3 include a first crown main groove 4 and a second crown main groove 5 that are provided such that the tire equator C is located therebetween. The first crown main groove 4 is provided between the tire equator C and the outer tread edge T1. The second crown main groove 5 is provided between the tire equator C and the inner tread edge T2.

The distance L1 in the tire axial direction from the tire equator C to the groove center line of the first crown main groove 4 and the distance L2 in the tire axial direction from the tire equator C to the groove center line of the second crown main groove 5 are, for example, preferably 0.08 to 0.20 times the tread width TW. In addition, in the present embodiment, the distance L1 is smaller than the distance L2.

Due to the presence of the main grooves 3, the tread portion 2 has a crown land portion 6, an outer shoulder land portion 7, and an inner shoulder land portion 8. The crown land portion 6 is demarcated between the first crown main groove 4 and the second crown main groove 5. The outer shoulder land portion 7 is demarcated between the first crown main groove 4 and the outer tread edge T1. The inner shoulder land portion 8 is demarcated between the second crown main groove 5 and the inner tread edge T2.

The outer shoulder land portion 7 has the largest width in the tire axial direction among the three land portions. Such an outer shoulder land portion 7 has high stiffness, and allows steering stability to be improved while good uneven wear resistance is exhibited. The width W5 in the tire axial direction of the outer shoulder land portion 7 is preferably, for example, 0.30 to 0.45 times the tread width TW.

Figure 2:
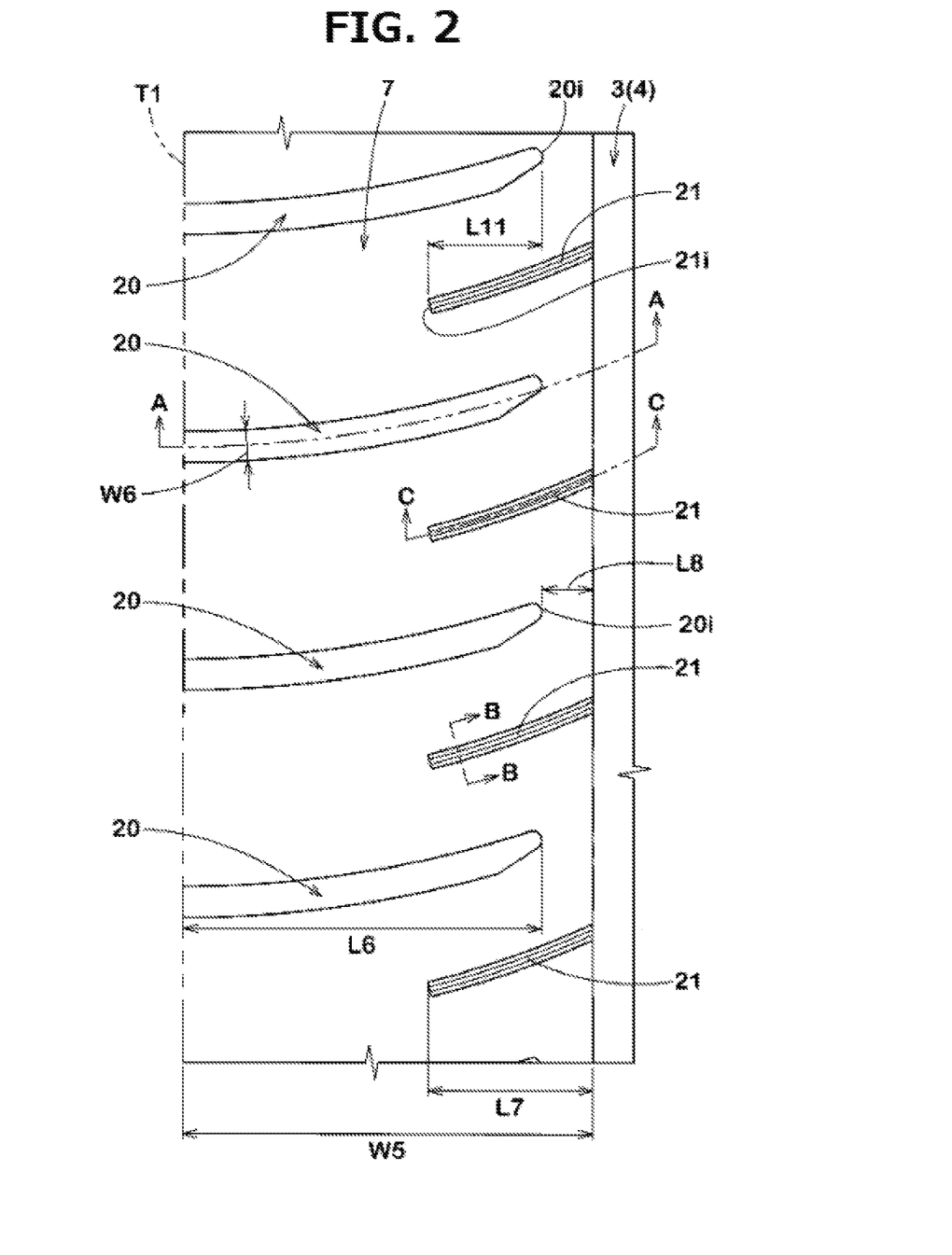
FIG. 2 is an enlarged view of an outer shoulder land portion in FIG. 1.

FIG. 2 shows an enlarged view of the outer shoulder land portion 7. As shown in FIG. 2, the outer shoulder land portion 7 has outer shoulder lateral grooves 20 and outer shoulder sipes 21. Each outer shoulder lateral groove 20 extends from the outer tread edge T1 and terminates within the outer shoulder land portion 7. Each outer shoulder sipe 21 extends from the first crown main groove 4 and terminates within the outer shoulder land portion 7. In the present specification, the term "sipe" is defined as a narrow cut having a body portion with a width less than 2.0 mm. The width of the main portion of the sipe is preferably less than 1.5 mm and more preferably 0.4 to 1.0 mm. The opening width of the sipe on a road surface may be, for example, 1.5 to 2.5 mm.

The outer shoulder lateral grooves 20 are easily opened at the outer tread edge T1 side and are unlikely to be opened at the terminal end side within the outer shoulder land portion 7. In addition, the outer shoulder sipes 21 are easily opened at the first crown main groove 4 side and are unlikely to be opened at the terminal end side within the outer shoulder land portion 7. Thus, the outer shoulder land portion 7, which has the outer shoulder lateral grooves 20 and the outer shoulder sipes 21, easily causes torsional deformation in a ground-contact surface thereof when a slip angle is given. Therefore, in the tire 1 according to the present invention, when a slip angle is given, the ground-contact surface of the outer shoulder land portion 7 immediately causes torsional deformation so as to follow a road surface, and further generates cornering force without delay. In particular, since the outer shoulder land portion 7 has the largest width in the tire axial direction among the three land portions, the outer shoulder land portion 7 can be expected to generate greater cornering force. Thus, the tire 1 according to the present invention has high initial responsiveness at the time of turning and exhibits good steering stability.

Each of the outer shoulder lateral grooves 20 and the outer shoulder sipes 21 has a terminal end within the outer shoulder land portion 7. In the present embodiment, the terminal ends 21i of the outer shoulder sipes 21 are located outward of the terminal ends 20i of the outer shoulder lateral grooves 20 in the tire axial direction. Accordingly, torsional deformation easily occurs in the outer shoulder land portion 7, and initial responsiveness can be further increased.

The distance L11 in the tire axial direction from the terminal end 20i of the outer shoulder lateral groove 20 to the terminal end 21i of the outer shoulder sipe 21 is, for example, 0.20 to 0.35 times the width W5 in the tire axial direction of the outer shoulder land portion 7. Accordingly, good initial responsiveness is exhibited while desired ride comfort is maintained.

Each outer shoulder lateral groove 20 is, for example, smoothly curved. For example, the angle of the outer shoulder lateral groove 20 relative to the tire axial direction preferably gradually increases from the outer tread edge T1 toward the first crown main groove 4 side. The angle of the outer shoulder lateral groove 20 relative to the tire axial direction is preferably, for example, 0 to 20°.

The length L6 in the tire axial direction of the outer shoulder lateral groove 20 is preferably, for example, 0.70 to 0.92 times the width W5 in the tire axial direction of the outer shoulder land portion 7. In addition, the groove width W6 of the outer shoulder lateral groove 20 is preferably 0.25 to 0.45 times the groove width W1 of the main groove 3.

Figure 3:
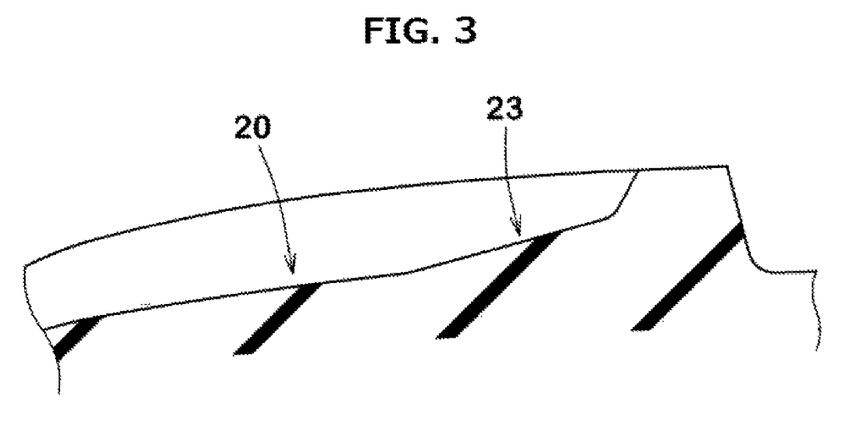
FIG. 3 is a cross-sectional view taken along a line A-A in FIG. 2.

FIG. 3 shows a cross-sectional view of the outer shoulder lateral groove 20 taken along a line A-A in FIG. 2. As shown in FIG. 3, the outer shoulder lateral groove 20 includes an inner portion 23 at the first crown main groove 4 side with respect to the terminal end 21i of the outer shoulder sipe 21 (shown in FIG. 2). For example, the depth of the inner portion 23 preferably gradually decreases toward the inner side in the tire axial direction. The outer shoulder lateral groove 20 having such an inner portion 23 allows ride comfort and steering stability to be improved in a balanced manner.

As shown in FIG. 2, each outer shoulder sipe 21 is, for example, curved so as to be convex in the same direction as the outer shoulder lateral groove 20. The angle of the outer shoulder sipe 21 relative to the tire axial direction is preferably within the same range as for the outer shoulder lateral grooves 20. The radius of curvature of the outer shoulder sipe 21 is preferably, for example, 100 to 150 mm.

The length L7 in the tire axial direction of the outer shoulder sipe 21 is preferably, for example, 0.30 to 0.70 times the width W5 in the tire axial direction of the outer shoulder land portion 7.

Figure 4A:
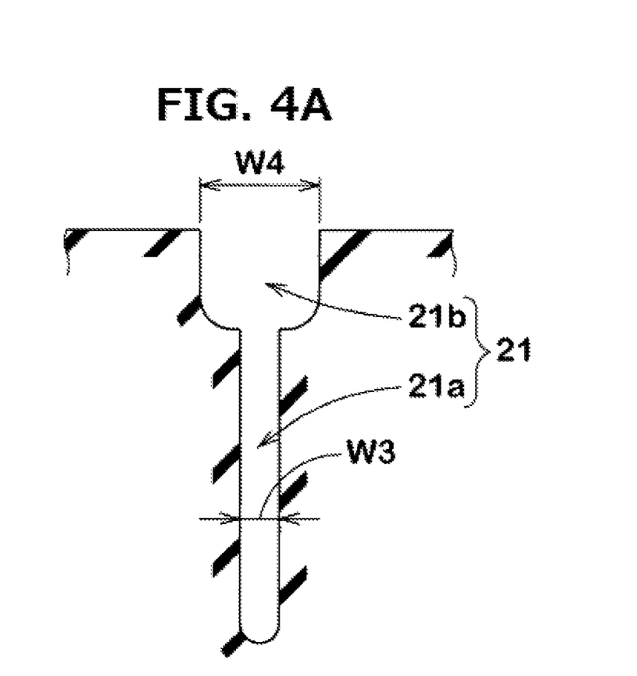
FIG. 4A is a cross-sectional view taken along a line B-B in FIG. 2.

FIG. 4A shows a cross-sectional view of the outer shoulder sipe 21 taken along a line B-B in FIG. 2. FIG. 4A shows a transverse cross-section orthogonal to the longitudinal direction of the outer shoulder sipe 21. As shown in FIG. 4A, the outer shoulder sipe 21 includes a body portion 21a and a wide portion 21b that is disposed outward of the body portion 21a in the tire radial direction and that has a larger width than the body portion 21a. The width W3 of the body portion 21a is preferably, for example, 0.4 to 0.8 mm. The width W4 of the wide portion 21b is preferably, for example, 1.0 to 2.0 mm. The width W4 of the wide portion 21b is more preferably 1.5 to 4.0 times the width W3 of the body portion 21a. Such an outer shoulder sipe 21 sufficiently reduces the stiffness of the outer shoulder land portion 7 and allows good ride comfort to be exhibited.

Figure 4B:
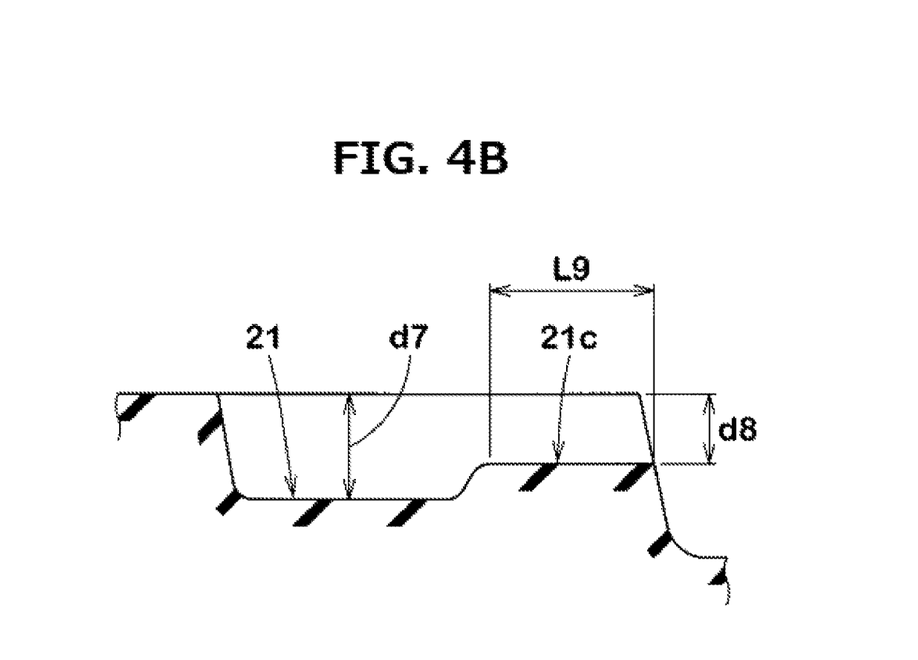
FIG. 4B is a cross-sectional view taken along a line C-C in FIG. 2.

FIG. 4B shows a cross-sectional view of the outer shoulder sipe 21 taken along a line C-C in FIG. 2. As shown in FIG. 4B, the outer shoulder sipe 21 has a shallow portion 21c having a depth smaller than the maximum depth of the outer shoulder sipe 21. In the present embodiment, for example, the outer shoulder sipe 21 has a shallow portion 21c at an end portion thereof at the inner side in the tire axial direction. The shallow portion 21c serves to inhibit the sipe from being excessively opened and improve steering stability.

The depth d8 of the shallow portion 21c is preferably 0.15 to 0.50 times the depth of the main groove 3. In addition, the depth d8 of the shallow portion 21c is, for example, 0.60 to 0.75 times the maximum depth d7 of the outer shoulder sipe 21.

The length L9 in the tire axial direction of the shallow portion 21c is preferably, for example, larger than the distance L8 (shown in FIG. 2) in the tire axial direction from a groove edge of the first crown main groove 4 to the terminal end 20i of the outer shoulder lateral groove 20. Such a shallow portion 21c can sufficiently inhibit the outer shoulder sipe 21 from being opened and allows steering stability and uneven wear resistance to be improved.

Figure 5:
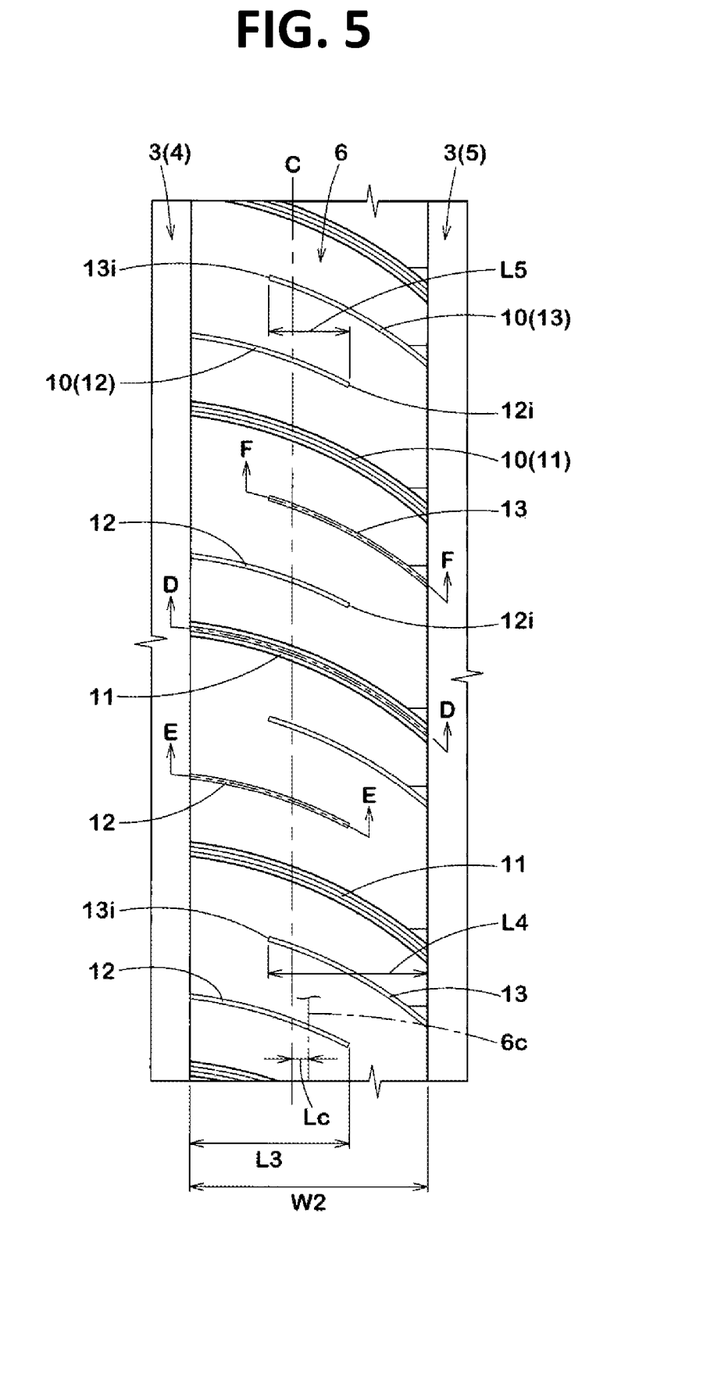
FIG. 5 is an enlarged view of a crown land portion in FIG. 1.

FIG. 5 shows an enlarged view of the crown land portion 6. As shown in FIG. 5, the width W2 of the crown land portion 6 is preferably, for example, 0.15 to 0.25 times the tread width TW (shown in FIG. 1, and the same applies below). In addition, the center in the tire axial direction of the crown land portion 6 is located at the second crown main groove 5 side with respect to the tire equator C. Accordingly, in the present embodiment, the width of the crown land portion 6 included in the inner tread portion 2B is increased, and good steering stability is exhibited.

A displacement amount Lc by which the center of the crown land portion 6 is displaced is preferably, for example, 0.05 to 0.10 times the width W2 in the tire axial direction of the crown land portion 6. The displacement amount Lc is the distance in the tire axial direction from the tire equator C to the center 6c in the tire axial direction of the crown land portion 6.

The crown land portion 6 has a plurality of crown sipes 10. The crown sipes 10 include first crown sipes 11, second crown sipes 12, and third crown sipes 13. Each first crown sipe 11 connects the first crown main groove 4 to the second crown main groove 5. Each second crown sipe 12 extends from the first crown main groove 4 and terminates within the crown land portion 6. Each third crown sipe 13 extends from the second crown main groove 5 and terminates within the crown land portion 6.

Each of such crown sipes 10 appropriately reduces the stiffness of the crown land portion 6 and allows ride comfort to be improved while desired steering stability is maintained. In addition, each crown sipe 10 also serves to make the stiffness distribution of the crown land portion 6 uniform and inhibit uneven wear of the crown land portion 6.

The second crown sipes 12 and the third crown sipes 13, which terminate within the crown land portion 6, make torsional deformation easily occur in the ground-contact surface of the crown land portion 6 and allow further increase in initial responsiveness at the time of turning.

Each first crown sipe 11 is preferably, for example, curved so as to be convex at one side in the tire circumferential direction. The radius of curvature of the first crown sipe 11 is, for example, 45 to 65 mm. The radius of curvature of the first crown sipe 11 is preferably, for example, smaller than the radius of curvature of the outer shoulder sipe 21. In addition, in the present embodiment, the angle of the first crown sipe 11 relative to the tire axial direction gradually increases from the first crown main groove 4 side toward the second crown main groove 5. The angle of the first crown sipe 11 relative to the tire axial direction is preferably, for example, 5 to 30°. Such a first crown sipe 11 can provide frictional force in multiple directions by the edges thereof.

The first crown sipe 11 preferably has the same cross-sectional shape as the outer shoulder sipe 21, in a transverse cross-section orthogonal to the longitudinal direction of the first crown sipe 11. That is, the first crown sipe 11 includes a body portion and a wide portion that is disposed outward of the body portion in the tire radial direction and that has a larger width than the body portion (not shown). Such a first crown sipe 11 serves to improve ride comfort.

Figure 6:
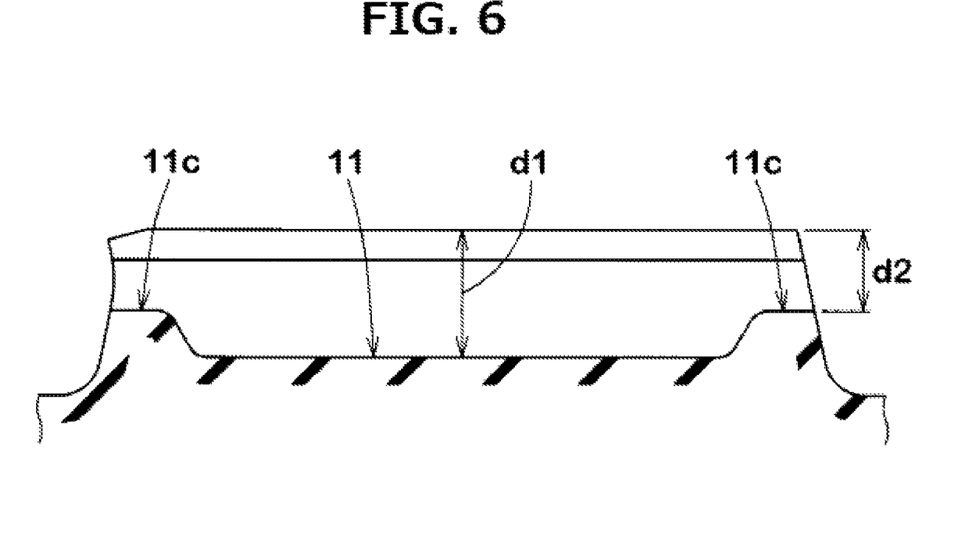
FIG. 6 is a cross-sectional view taken along a line D-D in FIG. 5.

FIG. 6 shows a cross-sectional view of the first crown sipe 11 taken along a line D-D in FIG. 5. As shown in FIG. 6, the first crown sipe 11 has a shallow portion 11c having a depth smaller than the maximum depth of the first crown sipe 11. In the present embodiment, the first crown sipe 11 has, for example, shallow portions 11c at both end portions thereof in the tire axial direction. Such a first crown sipe 11 can prevent the crown land portion 6 from being excessively opened when contact pressure is applied to the crown land portion 6, and allows good steering stability and uneven wear resistance to be exhibited.

The maximum depth d1 of the first crown sipe 11 is, for example, 0.60 to 1.00 times the depth of the main groove 3. The depth d2 of the shallow portion 11c of the first crown sipe 11 is, for example, 0.40 to 0.85 times the maximum depth d1.

As shown in FIG. 5, each second crown sipe 12 and each third crown sipe 13 are provided between two first crown sipes 11 adjacent to each other in the tire circumferential direction. The length L3 in the tire axial direction of the second crown sipe 12 and the length L4 in the tire axial direction of the third crown sipe 13 are, for example, 0.50 to 0.80 times the width W2 of the crown land portion 6.

Each of the second crown sipes 12 and the third crown sipes 13 has an inner end at which the crown sipe terminates within the crown land portion 6. In the present embodiment, the inner ends 13i of the third crown sipes 13 are located at the first crown main groove 4 side with respect to the inner ends 12i of the second crown sipes 12. A sipe overlapping length L5 that is the distance in the tire axial direction from the inner end 12i of the second crown sipe 12 to the inner end 13i of the third crown sipe 13 is preferably, for example, not less than 0.25 times and more preferably not less than 0.30 times, and is preferably not greater than 0.45 times and more preferably not greater than 0.40 times the width W2 of the crown land portion 6. Such arrangement of the second crown sipes 12 and the third crown sipes 13 serves to make torsional deformation of the crown land portion 6 easily occur and increase initial responsiveness.

Each of the second crown sipes 12 and the third crown sipes 13 is curved so as to be convex in the same direction as the first crown sipe 11. Accordingly, the angle of each of the second crown sipes 12 and the third crown sipes 13 relative to the tire axial direction gradually increases from the first crown main groove 4 side toward the second crown main groove 5 side. The angles of the second crown sipes 12 and the third crown sipes 13 relative to the tire axial direction and the radii of curvature of the second crown sipes 12 and the third crown sipes 13 are preferably within the same ranges as for the first crown sipes 11.

Each of the second crown sipes 12 and the third crown sipes 13 preferably, for example, extends from a tread surface of the land portion to a bottom portion so as to have a width of 0.4 to 0.8 mm. Accordingly, on the outer surface of the tread portion 2, the opening width of the first crown sipe 11 is larger than the opening width of the second crown sipe 12 and the opening width of the third crown sipe 13. Accordingly, the uneven wear resistance around the second crown sipe 12 and the third crown sipe 13 is improved.

Figure 7A:
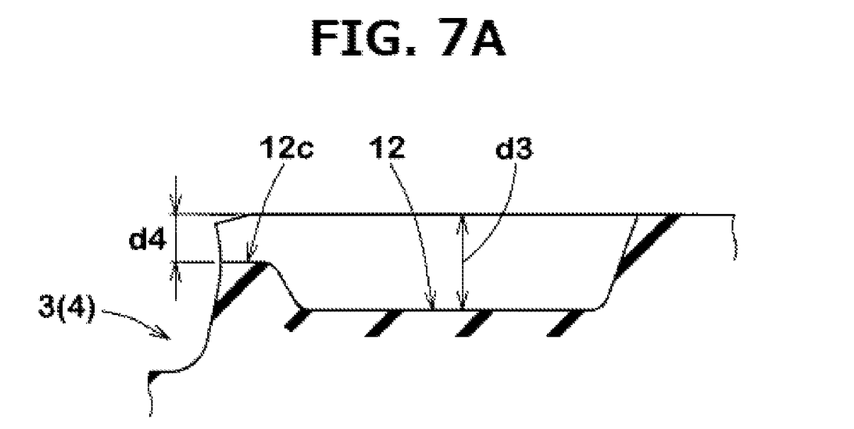
FIG. 7A is a cross-sectional view taken along a line E-E in FIG. 5.
Figure 7B:
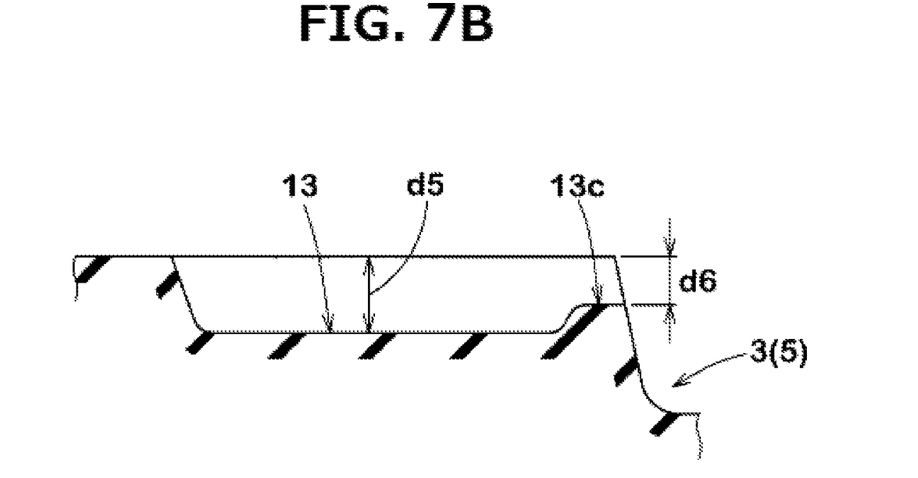
FIG. 7B is a cross-sectional view taken along a line F-F in FIG. 5.

FIG. 7A shows a cross-sectional view of the second crown sipe 12 taken along a line E-E in FIG. 5, and FIG. 7B shows a cross-sectional view of the third crown sipe 13 taken along a line F-F in FIG. 5. As shown in FIGS. 7A and 7B, the maximum depth d3 of the second crown sipe 12 and the maximum depth d5 of the third crown sipe 13 are each preferably smaller than the maximum depth d1 of the first crown sipe 11 and specifically 0.40 to 0.90 times the depth d1. Such a second crown sipe 12 and such a third crown sipe 13 serve to inhibit excessive decrease of the stiffness of the crown land portion 6 and improve steering stability.

The maximum depth d3 of the second crown sipe 12 is preferably larger than the maximum depth d5 of the third crown sipe 13.

In order to further increase initial responsiveness, the maximum depth d5 of the third crown sipe 13 is preferably larger than the depth d2 of the shallow portion 11c of the first crown sipe 11.

Each second crown sipe 12 preferably has a shallow portion 12c having a depth smaller than the maximum depth of the second crown sipe 12. Similarly, each third crown sipe 13 preferably has a shallow portion 13c having a depth smaller than the maximum depth of the third crown sipe 13. In the present embodiment, each shallow portion 12c or 13c is provided at an end portion at the main groove 3 side. Such a shallow portion 12c or 13c serves to inhibit the sipe from being excessively opened and improve steering stability.

The depth d4 of the shallow portion 12c of the second crown sipe 12 and the depth d6 of the shallow portion 13c of the third crown sipe 13 are, for example, 0.15 to 0.30 times the depth of the main groove 3. In a preferred embodiment, the depth d4 of the shallow portion 12c of the second crown sipe 12 and the depth d6 of the shallow portion 13c of the third crown sipe 13 are each smaller than the depth d2 of the shallow portion 11c of the first crown sipe 11. Accordingly, the stiffness around the second crown sipe 12 and the third crown sipe 13 is improved, and the uneven wear resistance improves.

Figure 8:
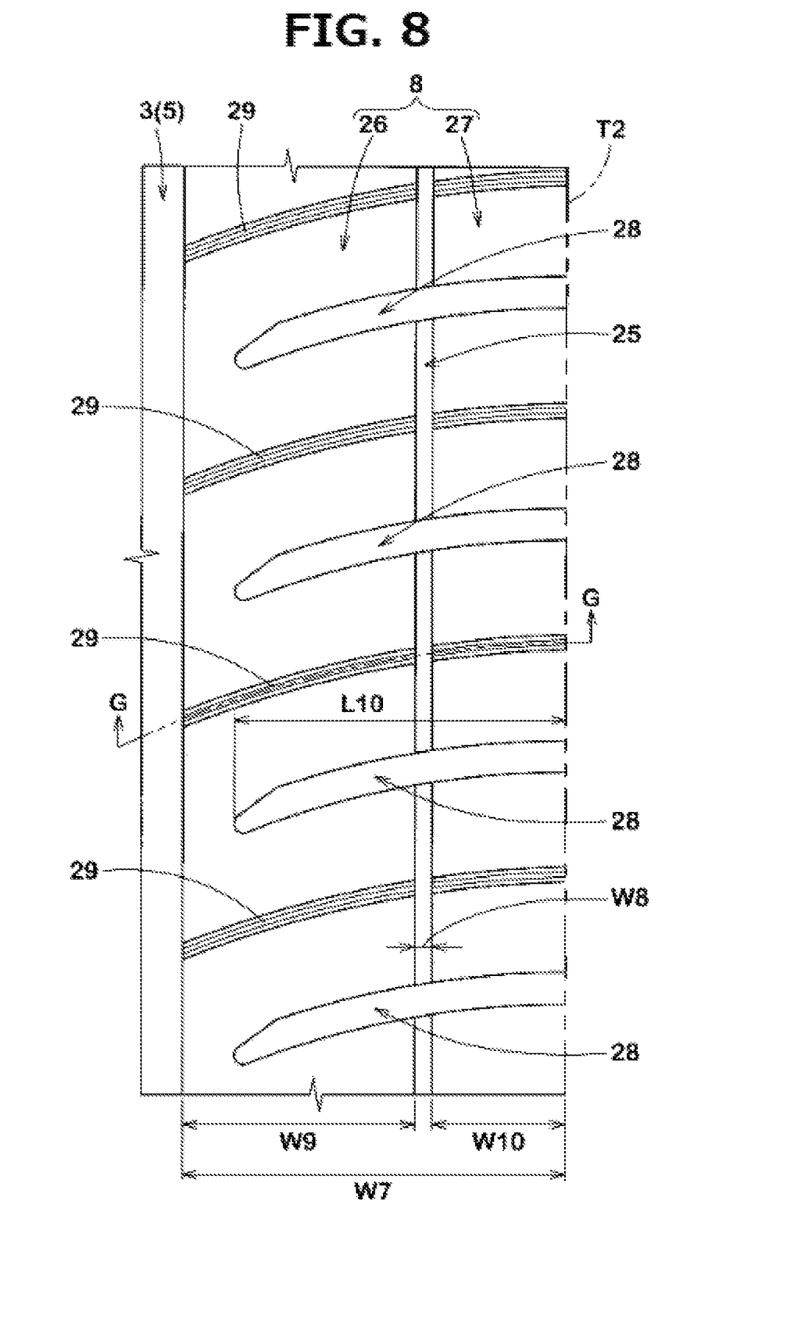
FIG. 8 is an enlarged view of an inner shoulder land portion in FIG. 1.

FIG. 8 shows an enlarged view of the inner shoulder land portion 8. As shown in FIG. 8, the width W7 in the tire axial direction of the inner shoulder land portion 8 is preferably, for example, 0.25 to 0.35 times the tread width TW.

The inner shoulder land portion 8 has a longitudinal narrow groove 25. The longitudinal narrow groove 25 has a groove width and a groove depth that are less than 5 mm, and is distinguished from the above main groove 3. In the present embodiment, the groove width W8 of the longitudinal narrow groove 25 is, for example, 0.20 to 0.30 times the groove width W1 of the main groove 3. The inner shoulder land portion 8 includes: a first portion 26 demarcated between the second crown main groove 5 and the longitudinal narrow groove 25; and a second portion 27 demarcated between the longitudinal narrow groove 25 and the inner tread edge T2.

The width W9 in the tire axial direction of the first portion 26 is preferably, for example, 0.55 to 0.65 times the width W7 of the inner shoulder land portion 8. The width W10 in the tire axial direction of the second portion 27 is preferably, for example, 0.30 to 0.40 times the width W7 of the inner shoulder land portion 8.

The inner shoulder land portion 8 has inner shoulder lateral grooves 28 and inner shoulder sipes 29. Each inner shoulder lateral groove 28 extends from the inner tread edge T2 and terminates within the inner shoulder land portion 8. Each inner shoulder sipe 29 extends from the second crown main groove 5 to the inner tread edge T2.

The inner shoulder lateral groove 28, for example, crosses the longitudinal narrow groove 25 and terminates within the first portion 26 of the inner shoulder land portion 8. The length L10 in the tire axial direction of the inner shoulder lateral groove 28 is preferably, for example, 0.80 to 0.90 times the width W7 in the tire axial direction of the inner shoulder land portion 8.

The depth of the inner shoulder lateral groove 28 preferably, for example, gradually decreases toward the inner side in the tire axial direction, between the longitudinal narrow groove 25 and the second crown main groove 5. Such an inner shoulder lateral groove 28 serves to improve ride comfort and steering stability in a balanced manner.

The inner shoulder sipe 29 is, for example, curved so as to be convex at one side in the tire circumferential direction. The radius of curvature of the inner shoulder sipe 29 is preferably, for example, larger than the radius of curvature of the first crown sipe 11. Specifically, the radius of curvature of the inner shoulder sipe 29 is 120 to 150 mm.

The inner shoulder sipe 29 preferably has the same cross-sectional shape as the first crown sipe 11, in a transverse cross-section orthogonal to the longitudinal direction of the inner shoulder sipe 29. That is, the inner shoulder sipe 29 includes a body portion and a wide portion that is disposed outward of the body portion in the tire radial direction and that has a larger width than the body portion (not shown). Such an inner shoulder sipe 29 serves to improve ride comfort.

Figure 9:
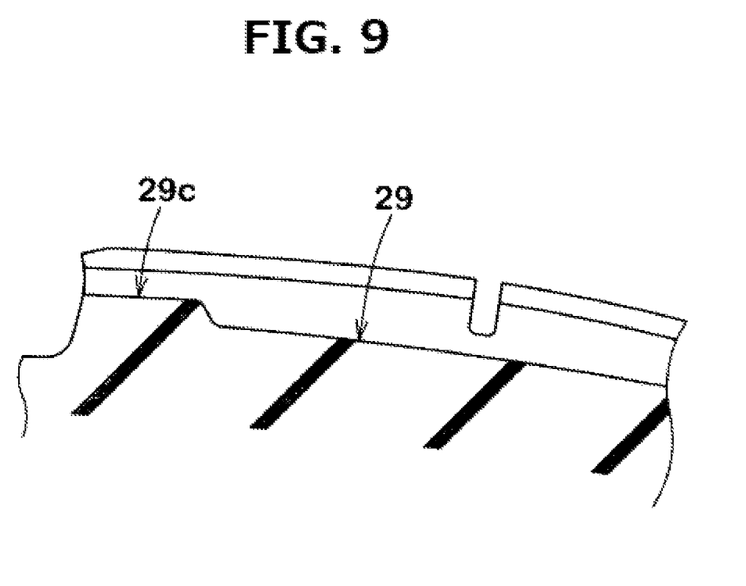
FIG. 9 is a cross-sectional view taken along a line G-G in FIG. 8.

FIG. 9 shows a cross-sectional view of the inner shoulder sipe 29 taken along a line G-G in FIG. 8. As shown in FIG. 9, the inner shoulder sipe 29 has a shallow portion 29c having a depth smaller than the maximum depth of the inner shoulder sipe 29. In the present embodiment, the inner shoulder sipe 29 has, for example, a shallow portion 29c at an end portion thereof at the inner side in the tire axial direction. The shallow portion 29c serves to inhibit the inner shoulder sipe 29 from being excessively opened and improve steering stability and uneven wear resistance.

In the present embodiment, the width in the tire axial direction of the shallow portion 29c provided in the inner shoulder sipe 29 is larger than the width in the tire axial direction of the shallow portion of each crown sipe 10. Such an inner shoulder sipe 29 serves to inhibit uneven wear of the inner shoulder land portion 8.

As shown in FIG. 1, a land ratio of the outer tread portion 2A is preferably greater than a land ratio of the inner tread portion 2B. Accordingly, the outer tread portion 2A exerts great cornering force and allows good steering stability to be exhibited. In the present specification, the term "land ratio" is a ratio Sb/Sa of an actual total contact area Sb to a whole area Sa of a virtual ground-contact surface obtained by filling each groove and each sipe.

Although the tire according to the embodiment of the present invention has been described in detail above, the present invention is not limited to the above specific embodiments, and various modifications can be made to implement the present invention.

EXAMPLES

Figure 10:
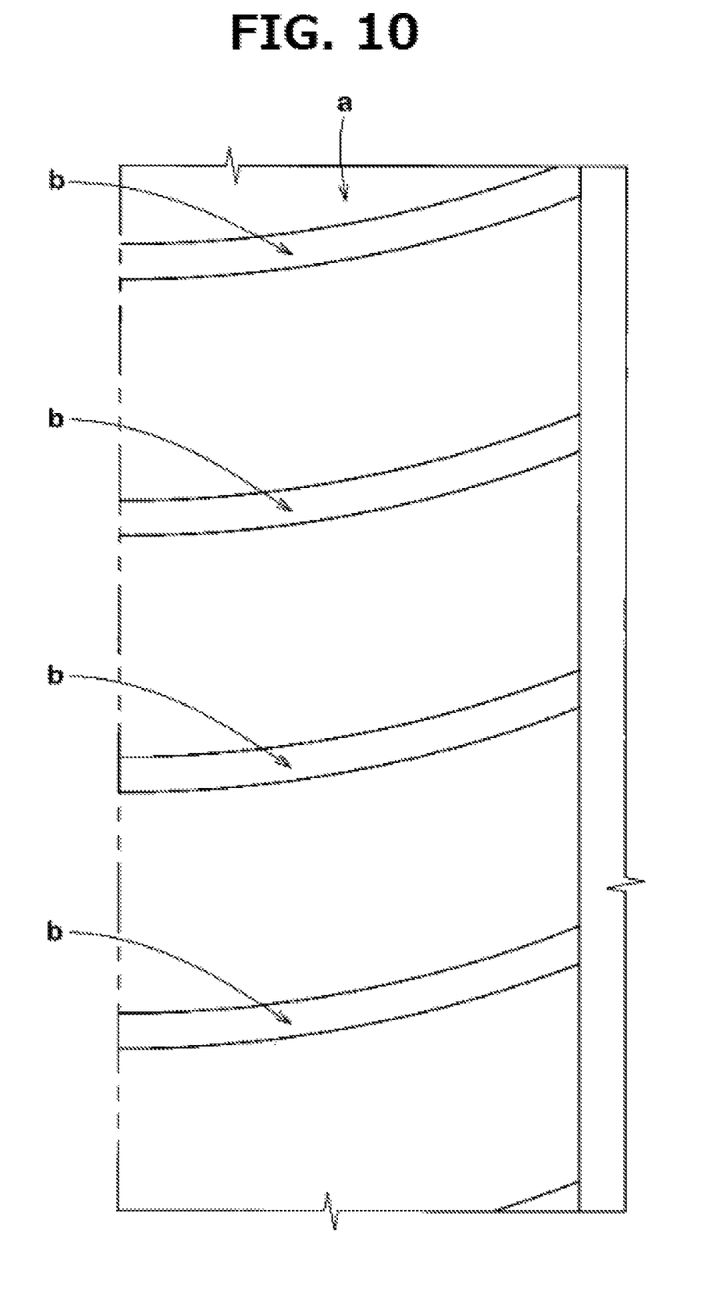
FIG. 10 is an enlarged view of an outer shoulder land portion of a comparative example.

Pneumatic tires with a size of 195/65R15 having the basic tread pattern in FIG. 1 were produced as test tires on the basis of specifications in Table 1. As a comparative example, a tire including an outer shoulder land portion a provided with lateral grooves b extending from an outer tread edge to an outer crown main groove as shown in FIG. 10 was produced as a test tire. The pattern of the tire of the comparative example is the same as shown in FIG. 1, except for the above structure. Each test tire was tested for steering stability and uneven wear resistance. The common specifications and the test methods for all the test tires are as follows.

Rim: 15×6.0
Tire internal pressure: 200 kPa
Test vehicle: a front-wheel-drive car having an engine displacement of 2000 cc
Tire mounted position: all wheels <Steering Stability>

Sensory evaluation was made by a driver for steering stability (including initial responsiveness at the time of turning) when the test vehicle ran on a paved road in a dry state. The results are indicated as scores with the score of the comparative example being 100. The greater the value is, the better the steering stability is.

<Uneven Wear Resistance>

The wear energy of each outer shoulder land portion was measured using a wear energy measuring device. The results are indicated as indexes with the wear energy of the comparative example being 100. The smaller the value is, the lower the wear energy is and the better the uneven wear resistance is.

The results of the tests are shown in Table 1.

TABLE 1

|  | Comparative Example | Example 1 | Example 2 | Example 3 | Example 4 | Example 5 | Example 6 | Example 7 | Example 8 | Example 9 |
|---|---|---|---|---|---|---|---|---|---|---|
| Drawing showing outer shoulder land portion | FIG. 10 | FIG. 2 | FIG. 2 | FIG. 2 | FIG. 2 | FIG. 2 | FIG. 2 | FIG. 2 | FIG. 2 | FIG. 2 |
| Length L6 of outer shoulder lateral groove/width W5 of outer shoulder land portion | 1.00 | 0.88 | 0.70 | 0.80 | 0.92 | 0.96 | 0.88 | 0.88 | 0.88 | 0.88 |
| Length L7 of outer shoulder sipe/width W5 of outer shoulder land portion | — | 0.40 | 0.40 | 0.40 | 0.40 | 0.40 | 0.30 | 0.50 | 0.60 | 0.70 |
| Steering stability (score) | 100 | 106 | 104 | 106 | 105 | 104 | 105 | 106 | 107 | 107 |
| Uneven wear resistance (index) | 100 | 97 | 97 | 97 | 98 | 99 | 97 | 97 | 98 | 99 |

As a result of the tests, it can be confirmed that the tires of the examples exhibit good steering stability. In addition, it can be confirmed that the tires of the examples also have improved uneven wear resistance.

What is claimed is:

1. A tire for which how the tire is to be oriented when mounted to a vehicle is specified, the tire comprising a tread portion, wherein
the tread portion has
an outer tread edge located at an outer side of the vehicle when the tire is mounted on the vehicle,
an inner tread edge located at an inner side of the vehicle when the tire is mounted on the vehicle,
a first crown main groove extending continuously in a tire circumferential direction between the outer tread edge and a tire equator,
a second crown main groove extending continuously in the tire circumferential direction at the inner tread edge side with respect to the first crown main groove, and
three land portions demarcated by the first crown main groove and the second crown main groove,
the land portions include an outer shoulder land portion demarcated between the outer tread edge and the first crown main groove, and an inner shoulder land portion demarcated between the inner tread edge and the second crown main groove,
the outer shoulder land portion has a largest width in a tire axial direction among the three land portions,
the outer shoulder land portion has an outer shoulder lateral groove that extends from the outer tread edge and that terminates within the outer shoulder land portion, and an outer shoulder sipe that extends from the first crown main groove and that terminates within the outer shoulder land portion,
the outer shoulder sipe has a maximum depth portion having a maximum depth, and a shallow portion contiguous with the maximum depth portion and separated from the maximum depth portion by a step, the shallow portion having a depth smaller than the depth of the maximum depth portion;
the shallow portion is disposed only at an end portion of the outer shoulder sipe at the inner side in the tire axial direction;
the outer shoulder lateral groove has a terminal end within the outer shoulder land portion,
a length in the tire axial direction of the shallow portion of the outer shoulder sipe is larger than a distance in the tire axial direction from a groove edge of the first crown main groove to the terminal end of the outer shoulder lateral groove,
the inner shoulder land portion has a longitudinal narrow groove having a width smaller than that of the first crown main groove and the second crown main groove, an inner shoulder lateral groove that extends from the inner tread edge, crosses the longitudinal narrow groove, and terminates within the inner shoulder land portion, and an inner shoulder sipe that extends from the second crown main groove to the inner tread edge, and
a depth of the inner shoulder lateral groove gradually decreases toward the inner side in the tire axial direction, between the longitudinal narrow groove and the second crown main groove.

2. The tire according to claim 1, wherein
each of the outer shoulder lateral groove and the outer shoulder sipe has a terminal end within the outer shoulder land portion, and
the terminal end of the outer shoulder sipe is located outward of the terminal end of the outer shoulder lateral groove in the tire axial direction.

3. The tire according to claim 2, wherein
the outer shoulder lateral groove includes an inner portion at the first crown main groove side with respect to the terminal end of the outer shoulder sipe, and
a depth of the inner portion gradually decreases toward an inner side in the tire axial direction.

4. The tire according to claim 1, wherein the outer shoulder sipe includes a body portion and a wide portion that is disposed outward of the body portion in a tire radial direction and that has a larger width than the body portion, in a transverse cross-section orthogonal to a longitudinal direction of the outer shoulder sipe.

5. The tire according to claim 1, wherein
the tread portion includes an outer tread portion located between the tire equator and the outer tread edge and an inner tread portion located between the tire equator and the inner tread edge, and
a land ratio of the outer tread portion is greater than a land ratio of the inner tread portion.

6. The tire according to claim 2, wherein the outer shoulder sipe includes a body portion and a wide portion that is disposed outward of the body portion in a tire radial direction and that has a larger width than the body portion, in a transverse cross-section orthogonal to a longitudinal direction of the outer shoulder sipe.

7. The tire according to claim 2, wherein
the tread portion includes an outer tread portion located between the tire equator and the outer tread edge and an inner tread portion located between the tire equator and the inner tread edge, and
a land ratio of the outer tread portion is greater than a land ratio of the inner tread portion.

8. The tire according to claim 1, wherein
the width in the tire axial direction of the outer shoulder land portion is 0.30 to 0.45 times the tread width.

9. The tire according to claim 1, wherein
a crown land portion is demarcated between the first crown main groove and the second crown main groove, a width in the tire axial direction of the crown land portion is 0.15 to 0.25 times the tread width.

10. The tire according to claim 1, wherein
a displacement amount by which the center of the crown land portion is displaced is 0.05 to 0.10 times the width in the tire axial direction of the crown land portion.

11. The tire according to claim 2, wherein
a distance in the tire axial direction from the terminal end of the outer shoulder lateral groove to the terminal end of the outer shoulder sipe is 0.20 to 0.35 times the width in the tire axial direction of the outer shoulder land portion.

12. The tire according to claim 1, wherein
an angle of the outer shoulder lateral groove relative to the tire axial direction is 0 to 20°.

13. The tire according to claim 1, wherein
a length in the tire axial direction of the outer shoulder lateral groove is 0.70 to 0.92 times the width in the tire axial direction of the outer shoulder land portion.

14. The tire according to claim 1, wherein the outer shoulder sipe further includes a body portion and a wide portion disposed outward of the body portion in a tire radial direction, the wide portion having a larger width than the body portion.

15. A tire for which how the tire is to be oriented when mounted to a vehicle is specified, the tire comprising a tread portion, wherein
the tread portion has
an outer tread edge located at an outer side of the vehicle when the tire is mounted on the vehicle,
an inner tread edge located at an inner side of the vehicle when the tire is mounted on the vehicle,
a first crown main groove extending continuously in a tire circumferential direction between the outer tread edge and a tire equator,
a second crown main groove extending continuously in the tire circumferential direction at the inner tread edge side with respect to the first crown main groove, and
three land portions demarcated by the first crown main groove and the second crown main groove,
the land portions include an outer shoulder land portion demarcated between the outer tread edge and the first crown main groove, and an inner shoulder land portion demarcated between the inner tread edge and the second crown main groove,
the outer shoulder land portion has a largest width in a tire axial direction among the three land portions,
the outer shoulder land portion has an outer shoulder lateral groove that extends from the outer tread edge and that terminates within the outer shoulder land portion, and an outer shoulder sipe that extends from the first crown main groove and that terminates within the outer shoulder land portion, and
the outer shoulder sipe has a maximum depth portion having a maximum depth, and a shallow portion contiguous with the maximum depth portion and separated from the maximum depth portion by a step, the shallow portion having a depth 0.60 to 0.75 times the depth of the maximum depth portion,
the outer shoulder lateral groove has a terminal end within the outer shoulder land portion,
a length in the tire axial direction of the shallow portion of the outer shoulder sipe is larger than a distance in the tire axial direction from a groove edge of the first crown main groove to the terminal end of the outer shoulder lateral groove,
the inner shoulder land portion has a longitudinal narrow groove having a width smaller than that of the first crown main groove and the second crown main groove, an inner shoulder lateral groove that extends from the inner tread edge, crosses the longitudinal narrow groove, and terminates within the inner shoulder land portion, and an inner shoulder sipe that extends from the second crown main groove to the inner tread edge.

16. A tire for which how the tire is to be oriented when mounted to a vehicle is specified, the tire comprising a tread portion, wherein
the tread portion has
an outer tread edge located at an outer side of the vehicle when the tire is mounted on the vehicle,
an inner tread edge located at an inner side of the vehicle when the tire is mounted on the vehicle,
a first crown main groove extending continuously in a tire circumferential direction between the outer tread edge and a tire equator,
a second crown main groove extending continuously in the tire circumferential direction at the inner tread edge side with respect to the first crown main groove, and
three land portions demarcated by the first crown main groove and the second crown main groove,
the land portions include an outer shoulder land portion demarcated between the outer tread edge and the first crown main groove, and an inner shoulder land portion demarcated between the inner tread edge and the second crown main groove,
the outer shoulder land portion has a largest width in a tire axial direction among the three land portions,
the outer shoulder land portion has an outer shoulder lateral groove that extends from the outer tread edge and that terminates within the outer shoulder land portion, and an outer shoulder sipe that extends from the first crown main groove and that terminates within the outer shoulder land portion, the outer shoulder sipe has a maximum depth portion having a maximum depth, and a shallow portion contiguous with the maximum depth portion, the shallow portion having a depth smaller than the depth of the maximum depth portion;

the shallow portion is disposed only at an end portion of the outer shoulder sipe at the inner side in the tire axial direction;

the outer shoulder lateral groove has a terminal end within the outer shoulder land portion, a length in the tire axial direction of the shallow portion of the outer shoulder sipe is larger than a distance in the tire axial direction from a groove edge of the first crown main groove to the terminal end of the outer shoulder lateral groove, the inner shoulder land portion has a longitudinal narrow groove, an inner shoulder lateral groove that extends from the inner tread edge, crosses the longitudinal narrow groove, and terminates within the inner shoulder land portion, and an inner shoulder sipe that extends from the second crown main groove to the inner tread edge, and the longitudinal narrow groove has a groove width 0.20 to 0.30 times a groove width of the first crown main groove and the second crown main groove.

\* \* \* \* \*